(12) United States Patent
Sun (10) Patent No.: US 11,958,520 B1
(45) Date of Patent: Apr. 16, 2024

(54) FOLDABLE CART

(71) Applicant: Zhejiang Pride Leisure Products Co., Ltd., Jinhua (CN)

(72) Inventor: Benlong Sun, Jinhua (CN)

(73) Assignee: ZHEJIANG PRIDE LEISURE PRODUCTS CO., LTD., Zhejiang (CN)

( * ) Notice: Subject to any disclaimer, the term of this patent is extended or adjusted under 35 U.S.C. 154(b) by 0 days.

(21) Appl. No.: 18/493,782

(22) Filed: Oct. 24, 2023

(30) Foreign Application Priority Data

Oct. 24, 2022 (CN) .......................... 202211302128.4

(51) Int. Cl.
*B62B 3/02* (2006.01)
*B62B 3/00* (2006.01)
*B62B 5/06* (2006.01)

(52) U.S. Cl.
CPC .............. *B62B 3/007* (2013.01); *B62B 3/022* (2013.01); *B62B 5/064* (2013.01)

(58) Field of Classification Search
CPC .......... B62B 3/007; B62B 3/022; B62B 5/064
See application file for complete search history.

(56) References Cited

U.S. PATENT DOCUMENTS

| 10,633,010 | B1* | 4/2020 | Zhang | B62B 3/025 |
|---|---|---|---|---|
| 10,871,007 | B1* | 12/2020 | Tsai | E04H 15/50 |
| 11,572,091 | B1* | 2/2023 | Wang | B62B 5/00 |
| 2021/0107549 | A1* | 4/2021 | Wang | B62B 3/007 |
| 2022/0396299 | A1* | 12/2022 | Chu | B62B 3/02 |

\* cited by examiner

*Primary Examiner* — Bryan A Evans
(74) *Attorney, Agent, or Firm* — WPAT LAW, P.C.; Anthony King (57) ABSTRACT

A foldable cart having a rectangular frame composed of a front wall and a back wall which are symmetric with each other, two symmetric side walls, and a bottom frame. Four wheels are disposed at four corners of a bottom surface of the rectangular frame. The front wall has two sliding seats, two vertical tubes, a folding assembly, two upper fixing seats and two lower fixing seats. Each side wall has two X-shaped side assemblies, a middle support tube, and a sliding sleeve slidably disposed around the middle support tube, wherein middle fixing seats are disposed at an upper end and a lower end of the middle support tube respectively, and each X-shaped side assembly is formed by two side cross tubes which are riveted together.

11 Claims, 8 Drawing Sheets

FOLDABLE CART

BACKGROUND OF THE INVENTION

1. Technical Field

The invention belongs to the technical field of carts, in particular to a foldable cart.

2. Description of Related Art

Carts, as transfer vehicles pushed and pulled manually, are indispensible in daily life, and are used to transfer light articles within a short distance extremely conveniently in places where motor vehicles are inapplicable. At present, there are two types of common carts: non-foldable carts formed by a carrying platform, as well as wheels and a handle disposed on the carrying platform, and foldable carts.

Chinese Patent Publication No.CN205469183U discloses a fixing structure of a foldable cart. The foldable cart comprises a cart frame and multiple wheels disposed at the bottom of the cart frame, wherein the cart frame comprises two frame bodies which are symmetrically arranged front and back, and a middle support frame disposed between the two frame bodies, the middle support frame comprises two I-shaped bars and a horizontal connecting bar used for connecting the two I-shaped b bars; each I-shaped bar is provided with an upper short bar, a lower short bar and a vertical bar used for connecting the upper short bar and the lower short bar, and the upper short bar is longer than the lower short bar; horizontal bars of the two frame bodies of the cart frame are pivoted to the upper short bars and lower short bars of the I-shaped bars respectively, the horizontal bars, pivoted to the lower short bars of the I-shaped bars, of the frame bodies are connected to the I-shaped bars through pivot members, each pivot member has one end fixed to the corresponding horizontal bar of one frame body and the other end pivoted to the lower short bar of the corresponding I-shaped bar, a slot is formed in a side, facing the corresponding lower short bar, of each pivot member, and bolts matched with the slots are disposed on two sides of the short bars of at least one I-shaped bar; when the bolts are disposed in the slots, the two frame bodies can be fixed in an unfolded state; and when the bolts disengage from the slots, the two frame bodies can be folded along the pivot points of the pivot members. Compared with traditional non-foldable carts, the carts can be folded through the fixing structure when not used, and the space occupied by the cart is reduced. However, compared with the height of the cart in use, the height of the foldable cart in the vertical direction is increased after the cart is folded, and the excessively high cart in the folded state cannot be stored easily. In addition, the frame bodies which are of a fixed structure function as the front side and the back side of the foldable cart, and the width of the frame bodies cannot be changed when the cart is folded, which limits the width of the front side and the back side of the cart, so after the cart is folded, the overall width of the front side and the back side remains unchanged, only the length is changed by folding the middle support frame between the two frame bodies, and thus, the cart still has a large size after being folded. In view of this, it is necessary to make a study and improvement to reduce the overall size of the cart.

BRIEF SUMMARY OF THE INVENTION

In view of the detects of the prior art, the objective of the invention is to provide a foldable cart, which can be folded without increasing the height, occupies less space when not used, and is convenient and fast to use and store.

To fulfill the above objective, the invention adopts the following technical solution: a foldable cart comprises a cart from, wherein the cart frame comprises a rectangular frame composed of a front wall and a back wall which are symmetric with each other, two symmetric side walls, and a bottom frame, four wheels are disposed at four corners of a bottom surface of the rectangular frame, the front wall comprises two sliding seats, two vertical tubes, a folding assembly, two upper fixing seats and two lower fixing seats, the sliding seats are slidably disposed around the vertical tubes, the upper fixing seats are mounted at upper ends of the vertical tubes, and the lower fixing seats are mounted at lower ends of the vertical tubes; the folding assembly comprises two upper horizontal tubes, two sliding connecting tubes and a middle connection piece, one end of each upper horizontal tube and one end of each sliding connecting tube are riveted to the middle connecting piece, and the other end of each upper horizontal tube and the other end of each sliding connecting tube are riveted to one upper fixing seat and one sliding seat respectively;

Each of the side walls comprises two X-shaped side assemblies, a middle support tube, and a sliding sleeve slidably disposed around the middle support tube, wherein middle fixing seats are disposed at an upper end and a lower end of the middle support tube respectively, each of the X-shaped side assemblies is formed by two side cross tubes which are riveted together, the two X-shaped side assemblies are symmetrically arranged on a front side and a back side of the middle support tube, upper ends of the two X-shaped side assemblies are riveted to the middle fixing seat at the upper end, and lower ends of the two X-shaped side assemblies are riveted to the sliding sleeve;

The bottom frame comprises two X-shaped support assemblies, two bottom short tubes and a support seat, wherein one end of one bottom short tube and one end of the other bottom short tube are riveted to a front side and a back side of the support seat respectively, and the two X-shaped support assemblies are symmetrically disposed on two sides of the two bottom short tubes; and each of X-shaped support assemblies comprises a center seat and four support tubes symmetrically riveted to the center seat, each support tube has an end riveted to the corresponding lower fixing seat or the middle fixing seat at the lower end, and the center seat is riveted to the other end of each bottom short tube.

Further, the support seat of the bottom frame is a U-shaped member with a bottom opening, first U-shaped slots with top openings are formed in a side facing the center of the center seat, and two ends of each bottom short tube are inlaid in the U-shaped member and one first U-shaped slot from the bottom opening and the top opening respectively and are then riveted.

Further, the center seat is of an X-shaped structure, four corners of the X-shaped structure correspond to four second U-shaped slots with bottom openings, and the support tubes are inlaid in the second U-shaped slots from the bottom openings and are riveted; and the first U-shaped slots are formed in a joint of outer walls of the two second U-shaped slots in the side facing the center of the X-shaped structure.

Further, the sliding seats are directly disposed around the vertical tubes and are able to slide upwards and downwards; or, the vertical tubes are provided with longitudinal sliding slots or sliding rails, and the sliding seats slide longitudinally along the sliding slots or the sliding rails.

Further, the middle fixing seat or the sliding sleeve of the side walls comprises a body and connecting slots extending along front and back sides of the body, and the side cross tubes are riveted in the connecting slots.

Further, upper grooves communicating an upper surface with side faces are formed in left and right sides of an upper end of the middle connecting piece of the front wall or the back wall, lower grooves communicating the side faces with a lower surface are formed in left and right sides of a lower end of the middle connecting piece, and the upper horizontal tubes and the sliding connecting tubes are inlaid in the upper grooves and the lower grooves respectively and are riveted.

Further, the foldable cart further comprises a handle assembly disposed on the front wall, wherein the handle assembly comprises a draw bar, a handle and a fixing assembly, the fixing assembly comprises two handle connecting tubes and a connecting tube seat, the handle, the draw bar and the connecting tube seat are assembled sequentially from top to bottom, a left end and a right end of the connecting tube seat are each riveted to one end of one handle connecting tube, and the other end of each handle connecting tube is riveted to one lower fixing seat.

Furthermore, the lock piece is U-shaped or V-shaped.

Furthermore, the fixing assembly further comprises a tube sleeve, a torsion spring and a tube joint, the handle connecting tubes are inlaid in third U-shaped slots of the tube sleeve and are riveted, and an end of the tube joint sleeved with the torsion spring stretches out of the tube sleeve to be riveted to the connecting tube seat.

Furthermore, the handle assembly further comprises an elastic sleeve, and a bottom of the handle, the elastic sleeve, and a mounting hole in an upper end of the connecting tube seat are sleeved with each other and fixed sequentially.

Furthermore, the draw bar comprises an upper pull tube, a lower pull tube and a lock piece, wherein the upper pull tube is disposed around the lower pull tube, a first through hole and a second through hole are formed in a lower end of the upper pull tube and a lower end of the lower pull tube respectively, and when the upper pull tube is pulled upwards to make the first through hole coincide with the second through hole, the lock piece is disposed in the lower pull tube, and a convex pin on the lock piece penetrates through the second through hole and the first through hole.

Furthermore, front ends of the lower fixing seats of the front wall extend forward to form support parts, lower mounting grooves communicating a lower surface with inner sides facing the center of the front wall are formed in the support parts, and the other end of each handle connecting tube is inlaid in one lower mounting groove and is then riveted.

Furthermore, the wheels are mounted on wheel carriers, and axles at upper ends of the wheel carriers are inlaid in bottoms of the vertical tubes.

By adoption of the technical solution, the invention has the following beneficial effects: all sides of the rectangular frames can be folded, such that the whole cart is foldable, smaller in size, and convenient and fast to fold and unfold; through the folding assembly of the front wall, the cart can be folded easily and has a smaller horizontal width; the X-shaped support assemblies of the bottom frame are connected to both the front wall or the back wall and the middle support tubes of the side walls, the two X-shaped support assemblies are connected in the middle through two bottom short tubes and fixing seats, such that the length of the cart is extended, more articles can be placed in the cart, and the support strength of the whole bottom frame is enhanced; and the handle assembly adopts the upper pull tube and the lower pull tube, such that the length of the handle assembly can be adjusted by users as actually needed, and the cart can be used more conveniently.

In the figures: 1, front wall; 11, vertical tube; 12, upper fixing seat; 13, lower fixing seat; 13a, support part; 13b, lower mounting groove; 14, sliding seat; 15, upper horizontal tube; 16, sliding connecting tube; 17, middle connecting piece; 17a, upper groove; 17b, lower groove; 18, screw; 2, back wall; 3, side wall; 31, side cross tube; 32, middle support tube; 33, sliding sleeve; 34, middle fixing seat; 4, bottom frame; 41, center seat; 41a, first U-shaped slot; 41b, second U-shaped slot; 42, support tube; 43, support seat; 44, bottom short tube; 5, wheel; 51, axle; 52, wheel carrier; 6, handle assembly; 61, handle; 62, upper pull tube; 62a, first through hole; 63, lower pull tube; 63a, second through hole; 64, lock piece; 64a, convex pin; 65, handle connecting tube; 66, connecting tube seat; 67, tube sleeve; 67a, third U-shaped slot; 68, torsion spring; 69, tube joint; 610, gasket; 612, elastic sleeve.

DETAILED DESCRIPTION OF THE INVENTION

To gain a better understanding of the technical solutions of the invention, the specific solutions and embodiments of the invention will be further expounded below in conjunction with the accompanying drawings.

As shown in FIG. 1-FIG. 8, this embodiment discloses a foldable cart, which comprises a rectangular frame formed by a front wall 1 and a back wall 2 which are symmetric with each other, two symmetric side walls 3, and a bottom frame 4, and four wheels 5 are disposed at four corners of a bottom surface of the rectangular frame.

The front wall 1 comprises two vertical tubes 11, a folding assembly, two upper fixing seats 12, two lower fixing seats 13, and two sliding seats 14, wherein the sliding seats 14 are disposed around the vertical tubes 11 and are able to slide upwards and downwards, a lower surface of each upper fixing seat 12 is open and is disposed around an upper end of one vertical tube 11, an upper surface of each upper fixing seat 12 seals one vertical tube 11, each lower fixing seat 13 is disposed around a lower end of one vertical tube 11, and two of the four wheels 5 are installed at bottoms of the vertical tubes 11. The folding assembly connected with the two vertical tubes 11 comprises two upper horizontal tubes 15, two sliding connecting tubes 16 and a middle connecting piece 17, wherein one end of each upper horizontal tube 15 and one end of each sliding connecting tube 16 are riveted to the middle connecting piece 17, and the other end of each upper horizontal tube 15 and the other end of each sliding connecting tube 16 are riveted to one upper fixing seat 13 and one sliding seat 14 respectively.

Each side wall 3 comprises two X-shaped side assemblies, a middle support tube 32, and a sliding sleeve 33 slidably disposed around the middle support tube 32, wherein middle fixing seats 34 are disposed at an upper end and a lower end of the middle support tube 32 respectively, each X-shaped side assembly is formed by two side cross tubes 31 which are riveted together, and the two X-shaped side assemblies are symmetrically arranged on a front side and a back side of the middle support tube 32, and an upper end and a lower end of each X-shaped side assembly are riveted to the middle fixing seat 34 at the upper end and the sliding sleeve 33 respectively.

The bottom frame 4 comprises two X-shaped support assemblies, two bottom short tubes 44, and a support seat 43, wherein one end of one bottom short tube 44 and one end of the other bottom short tube 44 are riveted to a front side and a back side of the support seat 43 respectively, and the two X-shaped support assemblies are symmetrically disposed on two sides of the two bottom short tubes; and each X-shaped support assembly comprises a center seat 41 and four support tubes 42 symmetrically riveted to the center seat, the other end of each support tube 42 is riveted to the corresponding lower fixing seat 13 or the middle fixing seat 34 at the lower end, and the center seat 41 is riveted to the other end of each bottom short tube 44.

The support seat 43 of the bottom frame 4 is a U-shaped member with a bottom opening, first U-shaped slots 41a with top openings are formed in a side facing the center of the center seat 41, and two ends of each bottom short tube 44 are inlaid in the U-shaped member and one first U-shaped slot 41a from the bottom opening and the top opening respectively and are then riveted. When the bottom frame needs to be folded, the support seat 43 is pulled upwards to drive the bottom short tubes 44 to move upwards, which in turn drives the two center seats 41 to move upwards to draw close to each other towards the center, such that the bottom frame 4 is folded.

When the foldable cart needs to be folded, users can quickly drive all sides of the cart to be folded by lifting the support seat 43 in the middle of the bottom frame 4, so as to fold the cart conveniently and quickly, and the space occupied by the cart is reduced when the cart is not used.

The center seat 41 may be specifically of an X-shaped structure, wherein four corners of the X-shaped structure correspond to four second U-shaped slots 41b with bottom openings, the support tubes 42 are inserted into the second U-shaped slots 41b from the bottom openings and are then riveted; and outer walls of the two second U-shaped slots 41b in the side facing the center of the X-shaped structure are connected, and a joint of the outer walls is formed with the first U-shaped slots 41a.

The middle fixing seat 34 or the sliding sleeve 33 of the side wall 3 comprises a body and connecting slots extending along a front side and a back side of the body, wherein the side cross tubes 31 are riveted in the connecting slots. The connecting slots of the sliding sleeve 33 are open upwards, and the connecting slots of the middle fixing seats 34 at the upper end and the lower end of the middle support tube 32 are open upwards and downwards respectively. When the cart is folded, the upper ends of the side cross tubes 31 are turned downwards with respect to the middle fixing seat 34 at the upper end, and the lower ends of the side cross tubes 31 are turned upwards with respect to the sliding sleeve 33. The connecting slot of the middle fixing seat 34 at the lower end is open upwards after the support tubes 42 of the bottom frame 4 are turned upwards to be folded.

Upper grooves 17a communicating an upper surface with side faces are formed in left and right sides of the upper end of the middle connecting piece 17 of the front wall 1 or the back wall 2 respectively, lower grooves 17b communicating with the side faces with a lower surface are formed in left and right sides of the lower end of the middle connecting piece 17 respectively, and the upper horizontal tubes 15 and the sliding connecting tubes 16 are inlaid in the upper grooves 17a and the lower grooves 17b respectively and are riveted.

In one embodiment, the sliding seats are directly disposed around the vertical tubes 11 and are able to slide upwards and downwards, and the diameter of through holes in the sliding seats 14 is greater than that of the vertical tubes 11. The sliding seats are disposed around the vertical tubes through the through holes and slide upwards and downwards freely along the vertical tubes.

In another embodiment, the vertical tubes 11 are provided with longitudinal sliding slots or sliding rails, and the sliding seats 14 slide along the sliding slots or the sliding rails as sliders. The length of the sliding slots or the sliding rails is designed to be less than or equal to that of the vertical tubes.

To allow users to pull the whole cart easily, a handle assembly 6 is disposed on the front wall of the rectangular frame and is riveted to the front wall 1. The handle assembly 6 comprises a draw bar, a handle 61 and a fixing assembly, wherein the fixing assembly comprises two handle connecting tubes 65 and a connecting tube seat 66, the handle 61, the draw bar and the connecting tube seat 66 are assembled sequentially from top to bottom, a left end and a right end of the connecting tube seat 66 are riveted to one end of one handle connecting tube 65 and one end of the other handle connecting tube 65 respectively, and the other end of each handle connecting tube 65 is riveted to one lower fixing seat 12.

To ensure that the handle assembly can restore automatically to be attached to the front wall 1 when not used, the fixing assembly further comprises a tube sleeve 67, a torsion spring 68 and a tube joint 69, wherein the handle connecting tubes 65 are inlaid in third U-shaped slots 67a of the tube sleeve 67 and are riveted, and one end of the tube joint 69 sleeved with the torsion spring 68 stretches out of the tube sleeve to be riveted to the connecting tube seat 66. Under the restoration effect of the torsion spring 68, the whole handle assembly can return automatically without being pulled manually. The third U-shaped slots 67a in the tube sleeve 67 are open upwards.

In order to reduce rotational buffer caused by the handle connecting tubes 65 inlaid and riveted in the tube sleeve 67, gaskets 610 are disposed between two sides of the outer wall of the end of the handle connecting tubes 65 inserted into the third U-shaped slots 67a and the tube sleeve 67, and rivets penetrate through the tube sleeve 67, the gaskets 610 and the handle connecting tubes 65 to rivet the tube sleeve 67, the gaskets 610 and the handle connecting tubes 65 together. The gaskets 610 are preferably made of a flexible material such as rubber.

In one preferred embodiment, the handle assembly further comprises an elastic sleeve 612, and the bottom of the handle, the elastic sleeve 612 and a mounting hole in an upper end of the connecting tube seat 66 are sleeved with each other and fixed sequentially. That is, the lower end of a lower pull tube 63, the elastic sleeve 612 and the mounting hole in the upper end of the connecting tube seat 66 are sequentially nested. The elastic sleeve 612 may be made of rubber or silica gel and fulfills a buffer effect when the whole handle assembly turns.

In this embodiment, the connecting tube seat 66 is of a T-shaped structure having three sides formed with openings, wherein the mounting hole in the upper end of the connecting tube seat 66 is used for mounting the lower pull tube, and the tube joint 69 penetrates through one end of the tube sleeve 67 to be inlaid in the opening in one side of the connecting tube seat 66.

In one embodiment, the draw bar a telescopic rod suitable for users with different heights, and comprises an upper pull tube 62, the lower pull tube 63, and a lock piece 64, wherein the upper pull tube 62 is disposed around the lower pull tube 63, a first through hole 62a and a second through hole 63a are formed in a lower end of the upper pull tube 62 and a lower end of the lower pull tube 63 respectively, the lock piece 64 is disposed at an upper end of the interior of the lower pull tube 63, and when the upper pull tube 42 is pulled to make the first through hole 62a coincide with the second through hole 63a, a convex pin 64a on the lock piece 64 penetrates through the second through hole 63a and the first through hole 62a.

In one embodiment, the lock piece 64 is U-shaped or V-shaped, and the convex pin 64a is disposed on an outer surface of the lock piece 64.

Figure 7:
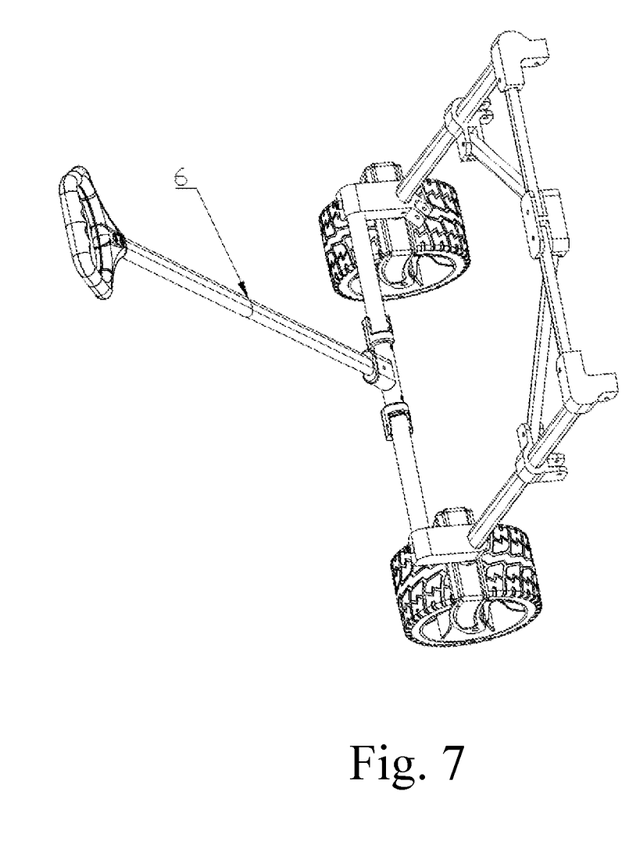
FIG. 7 is an assembled view of a handle assembly and a front wall.
Figure 8:
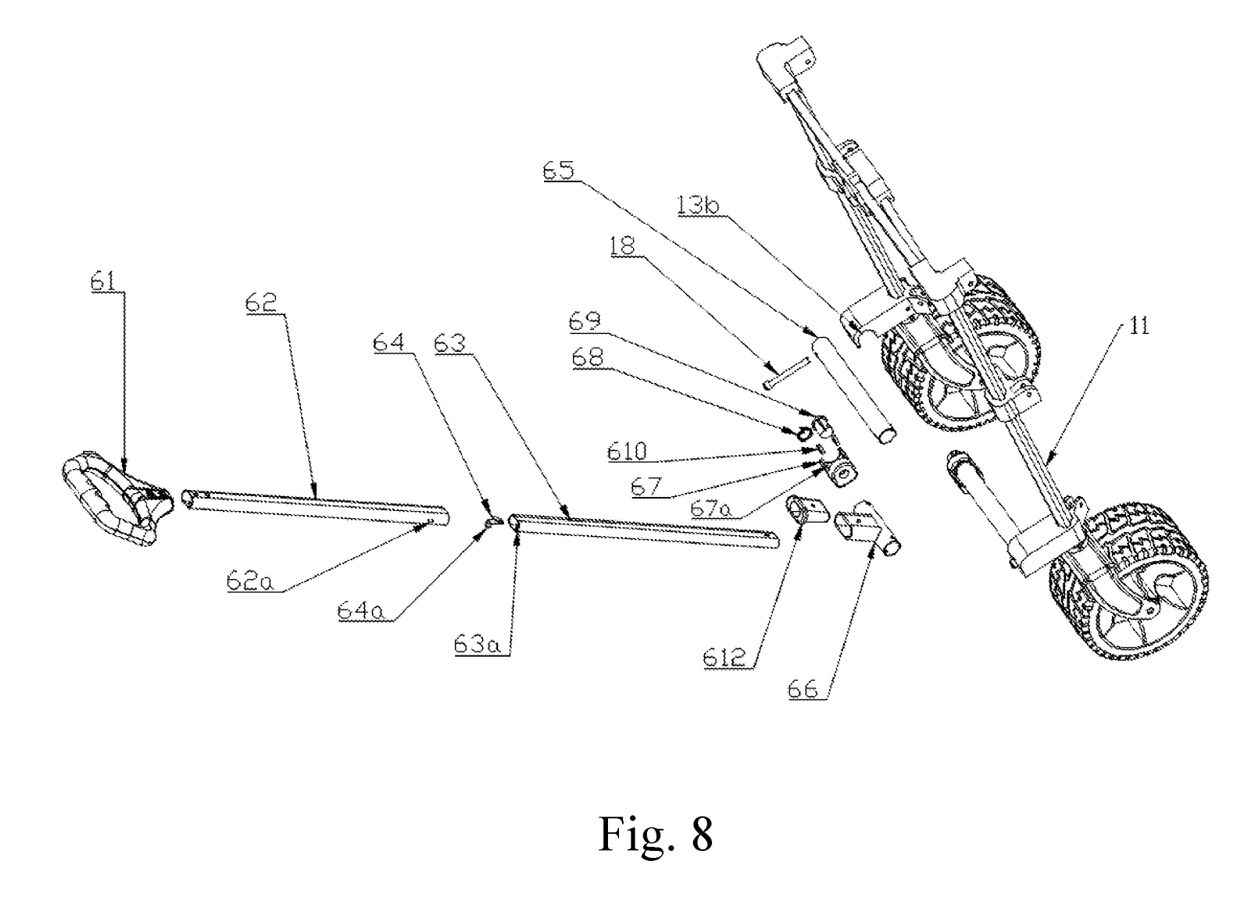
FIG. 8 is a disassembled view of the handle assembly and the front wall.

Different from the lower fixing seats of the back wall, front ends of the lower fixing seats 13 of the front wall 1 extend forward to form support parts 13a, lower mounting grooves 13b communicating lower surfaces and inner sides facing the center of the front wall are formed in the support parts 13a, and the other end of each handle connecting tube 65 is inlaid in one lower mounting groove 13b and is then riveted. Specifically, as shown in FIG. 7, screws 18 penetrate through the lower mounting grooves 13b and the handle connecting tubes 65 and are then locked and fixed with nuts, and the handle connecting tubes 65 can rotate downwards around the lower mounting grooves 13b with the screws 18 as the fulcrum to fulfill the effect shown in FIG. 4.

In this embodiment, the wheels 5 are mounted on wheel carriers 52, and axles 51 at upper ends of the wheel carriers 52 are inlaid in the bottoms of the vertical tubes 11.

Large articles to be transported can be directly placed on the cart frame, and various containers matched with the rectangular frame such as cloth bags or cartons can be disposed in the rectangular frame to store and transport small articles.

Figure 1:
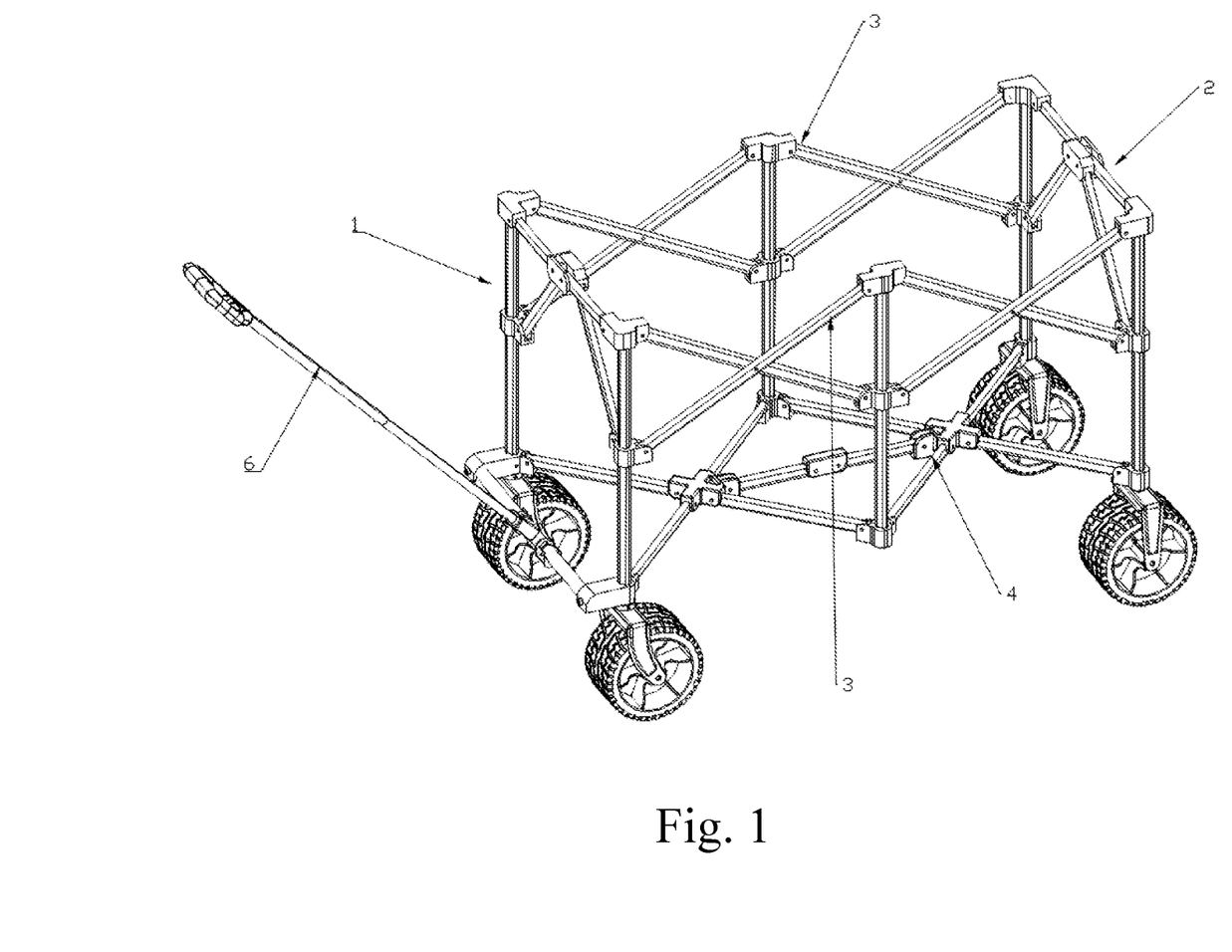
FIG. 1 is a three-dimensional view of a foldable cart from one perspective.
Figure 2:
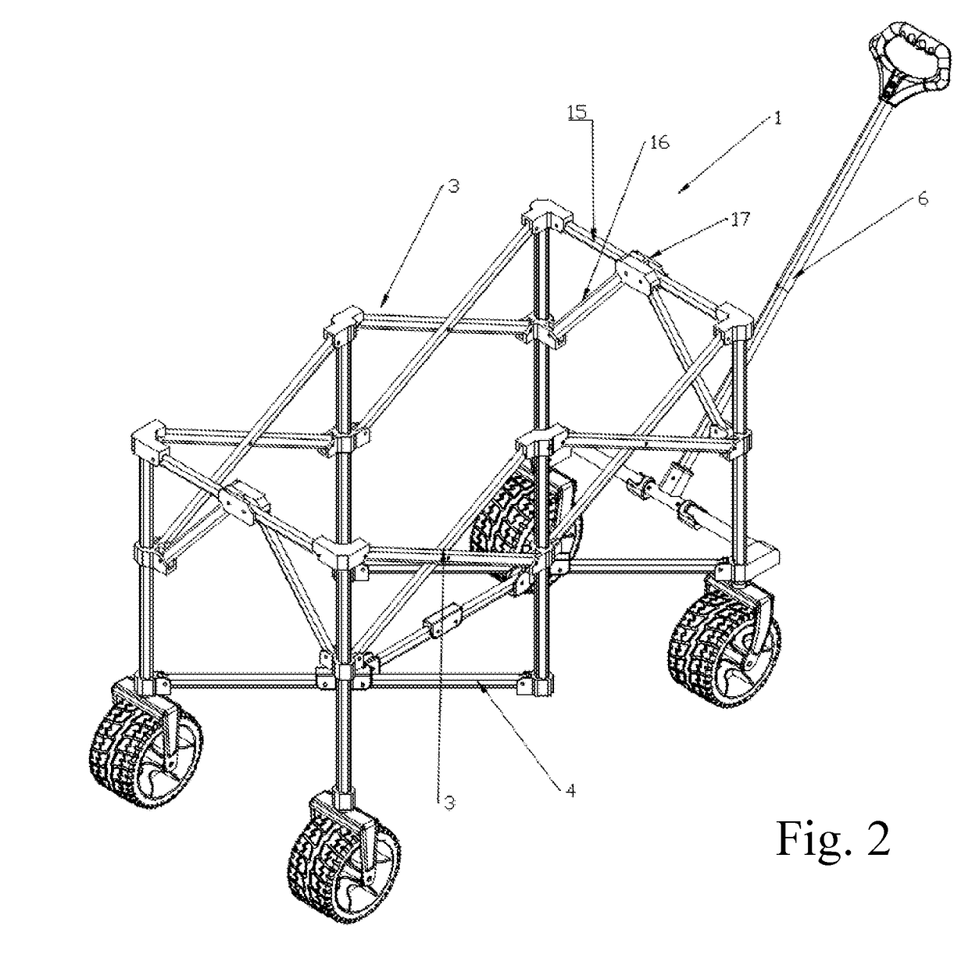
FIG. 2 is a three-dimensional view of the foldable cart from another perspective.
Figure 3:
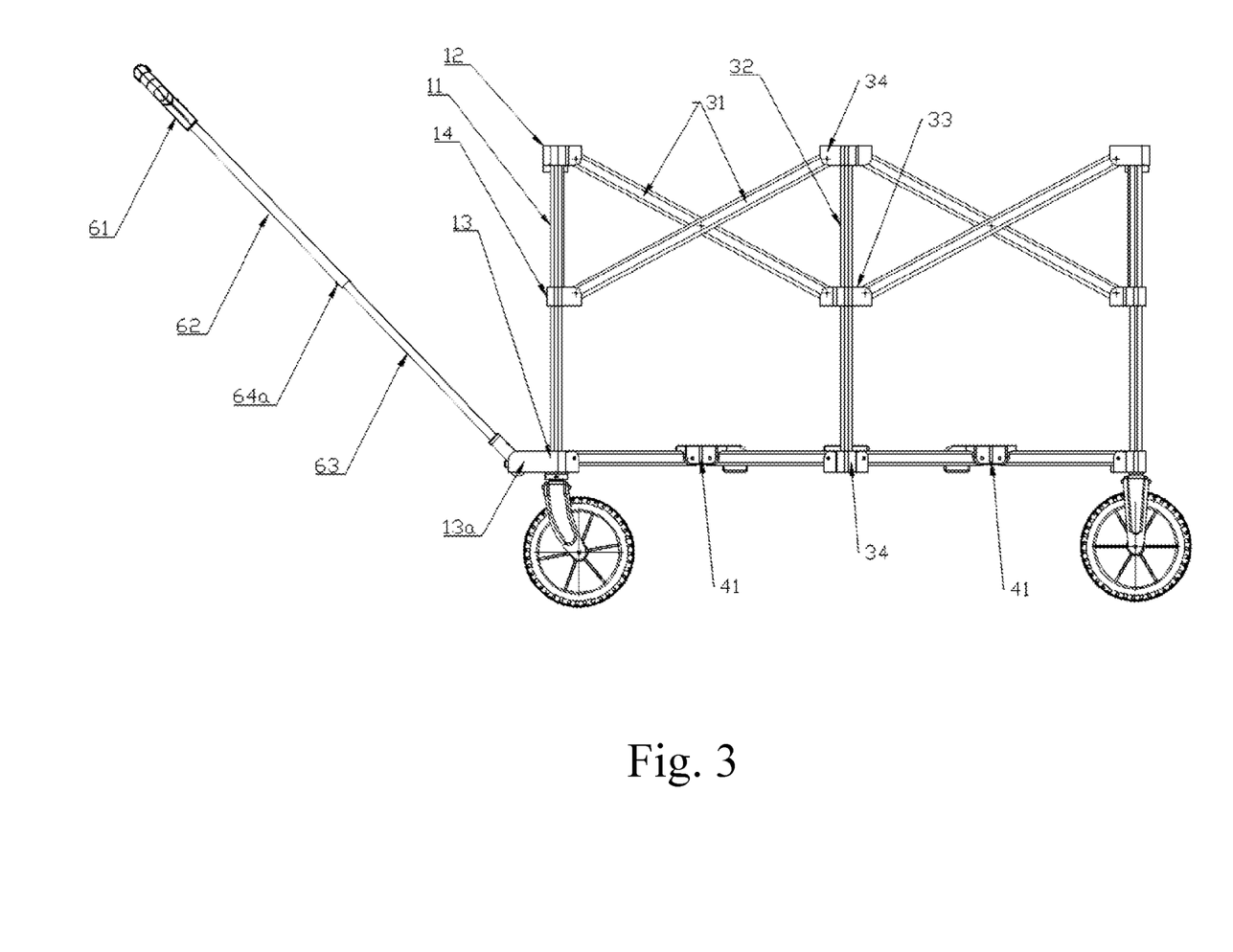
FIG. 3 is a side view of the foldable cart.
Figure 4:
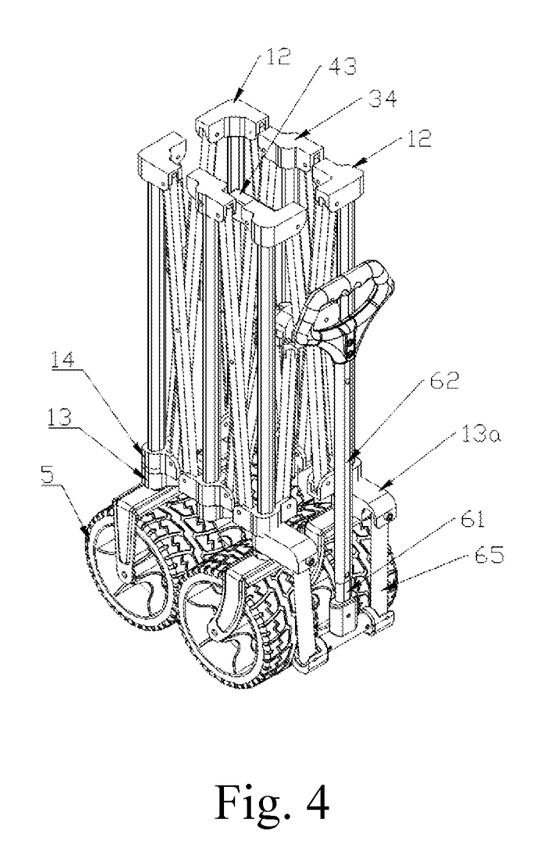
FIG. 4 is a view of the foldable cart in a folded state from one perspective.
Figure 5:
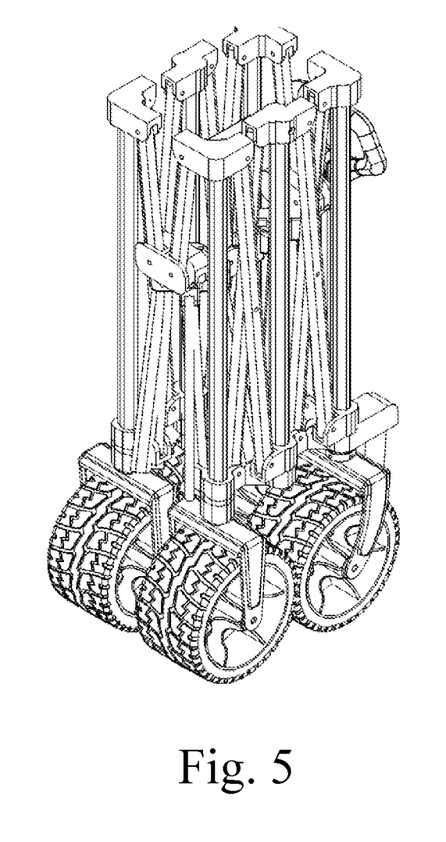
FIG. 5 is a view of the foldable cart in the folded state from another perspective.
Figure 6:
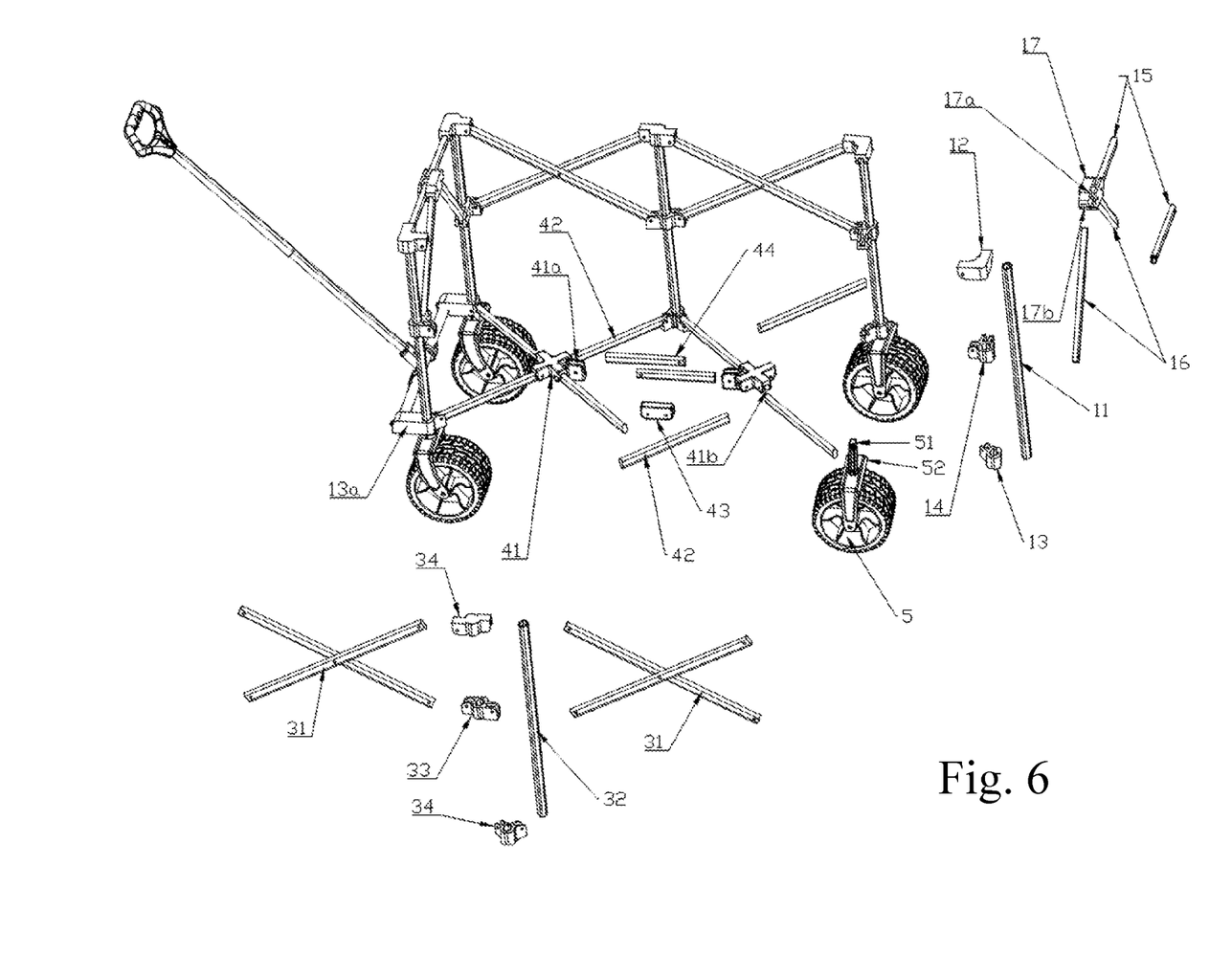
FIG. 6 is an exploded view of the foldable cart.

The folding process of the foldable cart is as follows:

The foldable cart in the unfolded state is shown in FIG. 1-FIG. 3. When the foldable cart needs to be folded to be stored, the support seat 43 of the bottom frame 4 is pulled upwards to drive the bottom short tubes 44 and the two center seats 41 connected to the bottom short tubes 44 to move upwards, the two center seats 41 draw close to each other towards the center, and the four support tubes 42 connected to each center seat 41 are turned to be folded towards the center seat, such that the X-shaped support assemblies are folded gradually, and thus, the bottom frame 4 is folded; at the same time, the two cross tubes 31 of the X-shaped side assemblies of the side walls 3 move close to each other gradually, the sliding seats 14 slide downwards along the vertical tubes 11 to the lower fixing seat 13 at the bottom, and the sliding sleeves 33 slide downwards along the middle support tubes 32 to the middle fixing seats 34 at the bottom, such that the side walls are folded; and similarly, the sliding seats 14 of the front wall 1 or the rear wall 2 slide downwards to drive the sliding connecting tubes 16, the middle connecting piece 17 and the upper horizontal tubes 15 to turn downwards to be folded. In the whole process, the whole foldable cart is folded by means of downward sliding of the four sliding seats 13 disposed on the four vertical tubes 11, and the two sliding sleeves 33, and the foldable cart in the folded state is shown in FIG. 4-FIG. 5. Under the action of the torsion spring 68, the handle assembly can be automatically attached to the front wall 1 when not pulled.

It should be noted that the preferred embodiments and the technical principle of the invention are described above. Those skilled in the art should understand that the invention is not limited to those specific embodiments described here, and can make various obvious changes, readjustments and substitutions without departing from the protection scope of the invention. So, although the invention has been described in detail with reference to the above embodiments, the invention is not limited to the these embodiments and may include more other equivalent embodiments without departing from the concept of the invention, and the scope of the invention should be defined by the scope of the appended claims.

What is claimed is:

1. A foldable cart comprising:
   a cart frame;
   wherein the cart frame having a rectangular frame composed of a front wall and a back wall which are symmetric with each other, two symmetric side walls, and a bottom frame, and four wheels being disposed at four corners of a bottom surface of the rectangular frame;
   wherein the front wall comprises two sliding seats, two vertical tubes, a folding assembly, two upper fixing seats and two lower fixing seats;
   wherein the sliding seats are slidably disposed around the vertical tubes, the upper fixing seats are mounted at upper ends of the vertical tubes, and the lower fixing seats are mounted at lower ends of the vertical tubes;
   wherein the folding assembly comprises two upper horizontal tubes, two sliding connecting tubes and a middle connection piece;
   wherein one end of each said upper horizontal tube and one end of each said sliding connecting tube are riveted to the middle connecting piece, and the other end of each said upper horizontal tube and the other end of each said sliding connecting tube are riveted to one said upper fixing seat and one said sliding seat respectively;
   wherein each of the side walls comprises two X-shaped side assemblies, a middle support tube, and a sliding sleeve slidably disposed around the middle support tube;
   wherein a plurality of middle fixing seats are disposed at an upper end and a lower end of the middle support tube respectively;
   wherein each of the X-shaped side assemblies is formed by two side cross tubes which are riveted together;
   wherein the two X-shaped side assemblies are symmetrically arranged on a front side and a back side of the middle support tube;
   wherein upper ends of the two X-shaped side assemblies are riveted to the middle fixing seat at the upper end, and lower ends of the two X-shaped side assemblies are riveted to the sliding sleeve;
   the bottom frame comprises two X-shaped support assemblies, two bottom short tubes and a support seat;
   wherein one end of one said bottom short tube and one end of the other bottom short tube are riveted to a front side and a back side of the support seat respectively, and the two X-shaped support assemblies are symmetrically disposed on two sides of the two bottom short tubes;

wherein each of X-shaped support assemblies comprises a center seat and four support tubes symmetrically riveted to the center seat; and wherein each said support tube has an end riveted to the corresponding lower fixing seat or the middle fixing seat at the lower end, and the center seat is riveted to the other end of each said bottom short tube.

2. The foldable cart according to claim 1, wherein the support seat of the bottom frame is a U-shaped member with a bottom opening, first U-shaped slots with top openings are formed in a side facing a center of the center seat, and two ends of each said bottom short tube are inlaid in the U-shaped member and one said first U-shaped slot from the bottom opening and the top opening respectively and are then riveted.

3. The foldable cart according to claim 2, wherein the center seat is of an X-shaped structure, four corners of the X-shaped structure correspond to four second U-shaped slots with bottom openings, and the support tubes are inlaid in the second U-shaped slots from the bottom openings and are riveted; and the first U-shaped slots are formed in a joint of outer walls of the two second U-shaped slots in the side facing the center of the X-shaped structure.

4. The foldable cart according to claim 1, wherein the sliding seats are directly disposed around the vertical tubes and are able to slide upwards and downwards; or, the vertical tubes are provided with longitudinal sliding slots or sliding rails, and the sliding seats slide longitudinally along the sliding slots or the sliding rails.

5. The foldable cart according to claim 1, wherein the middle fixing seat or the sliding sleeve of the side walls comprises a body and connecting slots extending along front and back sides of the body, and the side cross tubes are riveted in the connecting slots;

or, upper grooves communicating an upper surface with side faces are formed in left and right sides of an upper end of the middle connecting piece of the front wall or the back wall, lower grooves communicating the side faces with a lower surface are formed in left and right sides of a lower end of the middle connecting piece, and the upper horizontal tubes and the sliding connecting tubes are inlaid in the upper grooves and the lower grooves respectively and are riveted.

6. The foldable cart according to claim 1, further comprising a handle assembly disposed on the front wall, wherein the handle assembly comprises a draw bar, a handle and a fixing assembly, the fixing assembly comprises two handle connecting tubes and a connecting tube seat, the handle, the draw bar and the connecting tube seat are assembled sequentially from top to bottom, a left end and a right end of the connecting tube seat are each riveted to one end of one said handle connecting tube, and the other end of each said handle connecting tube is riveted to one said lower fixing seat.

7. The foldable cart according to claim 6, wherein the fixing assembly further comprises a tube sleeve, a torsion spring and a tube joint, the handle connecting tubes are inlaid in third U-shaped slots of the tube sleeve and are riveted, and an end of the tube joint sleeved with the torsion spring stretches out of the tube sleeve to be riveted to the connecting tube seat;

or, the handle assembly further comprises an elastic sleeve, and a bottom of the handle, the elastic sleeve, and a mounting hole in an upper end of the connecting tube seat are sleeved with each other and fixed sequentially.

8. The foldable cart according to claim 6, wherein the draw bar comprises an upper pull tube, a lower pull tube and a lock piece, the upper pull tube is disposed around the lower pull tube, a first through hole and a second through hole are formed in a lower end of the upper pull tube and a lower end of the lower pull tube respectively, and when the upper pull tube is pulled upwards to make the first through hole coincide with the second through hole, the lock piece is disposed in the lower pull tube, and a convex pin on the lock piece penetrates through the second through hole and the first through hole.

9. The foldable cart according to claim 7, wherein the draw bar comprises an upper pull tube, a lower pull tube and a lock piece, the upper pull tube is disposed around the lower pull tube, a first through hole and a second through hole are formed in a lower end of the upper pull tube and a lower end of the lower pull tube respectively, and when the upper pull tube is pulled upwards to make the first through hole coincide with the second through hole, the lock piece is disposed in the lower pull tube, and a convex pin on the lock piece penetrates through the second through hole and the first through hole.

10. The foldable cart according to claim 6, wherein front ends of the lower fixing seats of the front wall extend forward to form support parts, lower mounting grooves communicating a lower surface with inner sides facing a center of the front wall are formed in the support parts, and the other end of each said handle connecting tube is inlaid in one said lower mounting groove and is then riveted.

11. The foldable cart according to claim 1, wherein the wheels are mounted on wheel carriers, and axles at upper ends of the wheel carriers are inlaid in bottoms of the vertical tubes.

* * * * *